United States Patent
Jess et al.

(10) Patent No.: US 10,360,119 B2
(45) Date of Patent: Jul. 23, 2019

(54) DATA RECOVERY IN A DISTRIBUTED STORAGE SYSTEM

(71) Applicant: NetApp, Inc., Sunnyvale, CA (US)

(72) Inventors: Martin Jess, Boulder, CO (US);
Joseph Moore, Wichita, KS (US);
Ziling Huang, Boulder, CO (US)

(73) Assignee: NETAPP, INC., Sunnyvale, CA (US)

( * ) Notice: Subject to any disclaimer, the term of this patent is extended or adjusted under 35 U.S.C. 154(b) by 181 days.

(21) Appl. No.: 14/876,063

(22) Filed: Oct. 6, 2015

(65) Prior Publication Data
US 2017/0097875 A1    Apr. 6, 2017

(51) Int. Cl.
*G06F 11/10* (2006.01)
*G06F 11/20* (2006.01)

(52) U.S. Cl.
CPC ...... *G06F 11/2069* (2013.01); *G06F 11/1092* (2013.01); *G06F 2201/805* (2013.01); *G06F 2201/85* (2013.01)

(58) Field of Classification Search
CPC ............ G06F 11/1076; G06F 11/1084; G06F 11/1088; G06F 11/1092
See application file for complete search history.

(56) References Cited

U.S. PATENT DOCUMENTS

| | | | | |
|---|---|---|---|---|
| 6,158,017 A * | 12/2000 | Han | ........... | G06F 11/1076 711/114 |
| 8,868,865 B1 * | 10/2014 | Kondoh | ........... | G06F 13/28 711/100 |
| 2007/0180292 A1 * | 8/2007 | Bhugra | ........... | G06F 11/1092 714/6.13 |
| 2009/0132760 A1 * | 5/2009 | Flynn | ........... | G06F 1/183 711/113 |
| 2011/0208994 A1 * | 8/2011 | Chambliss | ........... | G06F 11/1092 714/6.24 |
| 2013/0013960 A1 * | 1/2013 | Gladwin | ........... | G06F 11/1084 714/6.3 |
| 2013/0205167 A1 * | 8/2013 | Deepak | ........... | G06F 11/2094 714/6.24 |
| 2013/0339818 A1 | 12/2013 | Baker et al. | | |

(Continued)

OTHER PUBLICATIONS

International Search Report and Written Opinion for Application No. PCT/US16/55553 dated Jan. 10, 2017, 10 pages.

(Continued)

*Primary Examiner* — Yolanda L Wilson
(74) *Attorney, Agent, or Firm* — Haynes and Boone, LLP (57) ABSTRACT

A system, method, and machine-readable storage medium for recovering data in a distributed storage system are provided. In some embodiments, the method includes identifying a failing storage device of a first storage node having an inaccessible data segment. When it is determined that the inaccessible data segment cannot be recovered using a first data protection scheme, a first chunk of data associated with the inaccessible data segment is identified and a group associated with the first chunk of data is identified. A second chunk of data associated with the group is selectively retrieved from a second storage node such that data associated with an accessible data segment of the first storage node is not retrieved. The inaccessible data segment is recovered by recovering the first chunk of data using a second data protection scheme and the second chunk of data.

19 Claims, 6 Drawing Sheets

(56) References Cited

U.S. PATENT DOCUMENTS

| | | |
|---|---|---|
| 2014/0164699 A1 | 6/2014 | Resch et al. |
| 2014/0173235 A1 | 6/2014 | Molaro et al. |
| 2014/0244672 A1 | 8/2014 | Molaro et al. |
| 2014/0317447 A1 | 10/2014 | Colgrove et al. |
| 2014/0380126 A1* | 12/2014 | Yekhanin ................ G06F 11/10 714/766 |
| 2015/0033070 A1* | 1/2015 | Ma ...................... G06F 11/1088 714/6.24 |
| 2015/0100821 A1* | 4/2015 | Sakurai ............... G06F 11/1092 714/6.23 |
| 2015/0220398 A1* | 8/2015 | Schirripa ............ G06F 11/1469 707/675 |
| 2016/0019114 A1* | 1/2016 | Han ................... G06F 11/1076 714/764 |
| 2016/0041887 A1* | 2/2016 | Davis ................. G06F 11/1612 714/6.2 |

OTHER PUBLICATIONS

Extended European Search Report for Application No. EP16854240, dated May 8, 2019, 9 Pages.

* cited by examiner

DATA RECOVERY IN A DISTRIBUTED STORAGE SYSTEM

TECHNICAL FIELD

The present description relates to data recovery, and more specifically, to a system, method, and machine-readable storage medium for recovering data in a distributed storage system.

BACKGROUND

Networks and distributed storage allow data and storage space to be shared between devices located anywhere a connection is available. These implementations may range from a single machine offering a shared drive over a home network to an enterprise-class cloud storage array with multiple copies of data distributed throughout the world. Larger implementations may incorporate Network Attached Storage (NAS) devices, Storage Area Network (SAN) devices, and other configurations of storage elements and controllers in order to provide data and manage its flow. Improvements in distributed storage have given rise to a cycle where applications demand increasing amounts of data delivered with reduced latency, greater reliability, and greater throughput. Hand-in-hand with this trend, system administrators have taken advantage of falling storage prices to add capacity wherever possible.

One consequence of the abundance of cheap storage is the need to protect and recover increasing amounts of data. Even though storage devices have become more reliable, they are not infallible. At the system level, multiple storage devices may be grouped in a RAID array or other grouping configured to provide redundancy using parity, mirroring, or other techniques. In theory, should a device fail, the storage system can recover lost data from the remaining devices. In practice, the probability of multiple-device failures increases with each storage device added, and any data protection scheme has a limit to how many concurrent failures can be tolerated. As a result, it is still possible for a catastrophic failure to exceed the ability of the RAID array to recover.

Other techniques for data recovery leverage the distributed nature of some storage environments. For example, a storage environment may be arranged as a cluster of discrete systems (e.g., storage nodes) coupled by a network. Copies of data and/or recovery information may be distributed over the storage nodes so that data is not lost should an entire storage node fail. However, when a node fails, the amount of data transferred over the network to rebuild the node may be several times larger than the amount contained in the node. For example, rebuilding a 200 TB node may entail transferring 1.2 PB or more between nodes. Even if the rebuild process does not halt all data transactions, the network burden may severely delay those transactions still being processed.

Accordingly, a technique for distributing data and for recovering data in the event of a node failure without rebuilding a node entirely would provide numerous practical and real-world advantages. Thus, while existing techniques for data recovery have been generally adequate, the techniques described herein provide a robust data protection scheme with greater recovery options.

BRIEF DESCRIPTION OF THE DRAWINGS

The present disclosure is best understood from the following detailed description when read with the accompanying figures.

DETAILED DESCRIPTION

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments, unless noted otherwise. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and computer programs for recovering data in a distributed storage system. In an exemplary embodiment, the distributed storage system divides data objects into groups of data chunks. Each group also contains recovery chunks generated according to an upper-level data protection scheme. The upper-level data protection scheme allows the data to be recreated should some of the chunks be lost. Each chunk (data or recovery) is distributed to a storage node for storing. At the storage node, the chunk is divided into segments and stored according to a lower-level data protection scheme, such as RAID 1, 5, or 6.

If a storage node fails, the node data can be recreated by rebuilding the node, which includes requesting other chunks from other storage nodes in order to recreate each chunk of data stored on the storage node. Recovering all of the data chunks on the storage node in this manner may be referred to as a full rebuild of the node and is significantly taxing on both the node and the network. However, the present technique also provides other recovery options that are less burdensome. For example, if some storage devices of the storage node fail, the storage node may first attempt to recreate data on the failed storage devices using the lower-level data protection scheme. To do so, the storage node may read data from the remaining storage devices on the same node. Because this can be done without accessing the network, the impact on other nodes is minimized.

If the lower-level data protection scheme cannot recover the data alone, which may occur if too many storage devices fail concurrently, the present technique also provides a partial node rebuild option. In one example, the storage node identifies the inaccessible data segments on the failed storage device(s) and the chunks to which they correspond. The storage node requests only the chunks needed to rebuild the inaccessible chunks (not all the chunks stored on the node). From the received chunks, the storage node recreates the inaccessible chunks and from them, recreates the data of the inaccessible segments. This data can be written to a replacement storage device.

In this manner, the present technique provides an improvement to conventional data storage and recovery technique with substantial advantages. For example, far less data may be transferred during a partial node rebuild than during a full node rebuild because the size of the dataset being rebuilt is smaller. In this manner, a partial rebuild greatly reduces the network impact associated with a storage device failure. As another example, because the dataset is smaller, a partial rebuild may reduce the processing burden on the rebuilding node, which may allow the rebuilding node to continue to service transactions using the accessible segments. As yet another example, a partial node rebuild may be completed quicker than a full node rebuild. This reduces the rebuilding window when the storage node is most vulnerable to data loss caused by further device failures. Of course, these advantages are merely exemplary, and no particular advantage is required for any particular embodiment.

Figure 1:
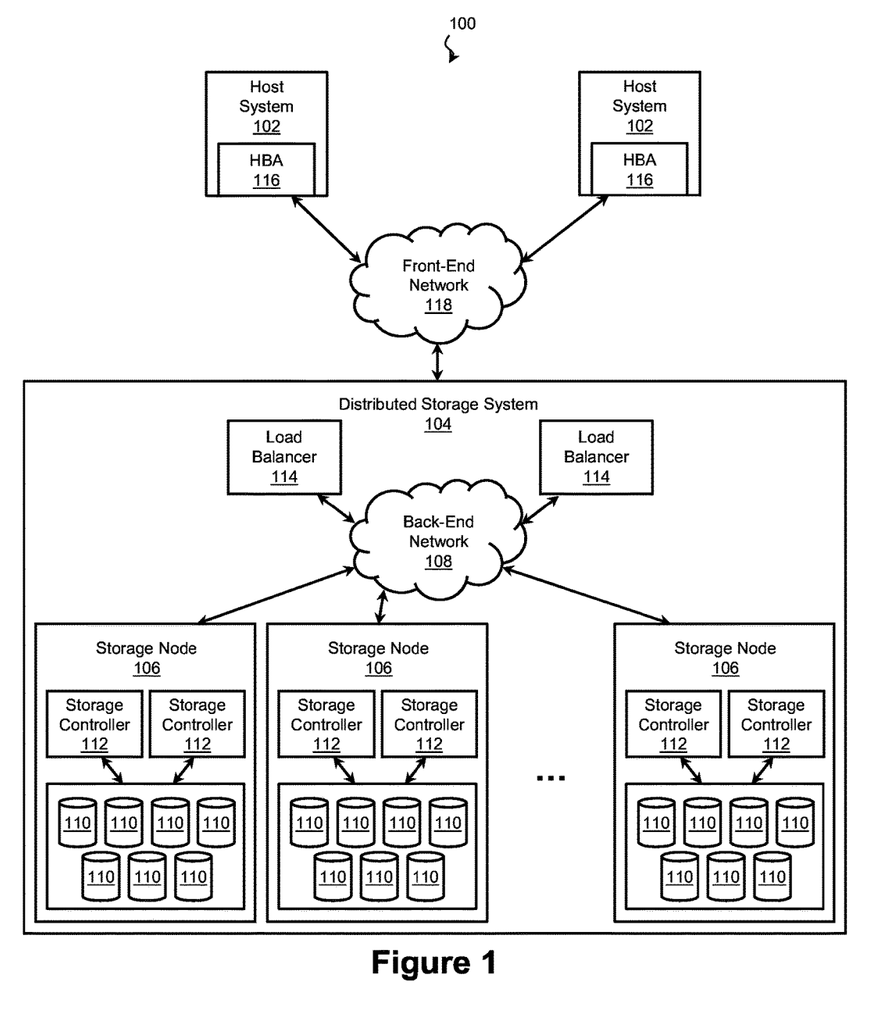
FIG. 1 is a schematic diagram of a computing architecture according to aspects of the present disclosure.

FIG. 1 is a schematic diagram of a computing architecture 100 according to aspects of the present disclosure. The computing architecture 100 includes one or more host systems 102 (hosts), each of which may interface with a distributed storage system 104 to store and manipulate data. The distributed storage system 104 may use any suitable architecture and protocol. For example, in some embodiments, the distributed storage system 104 is a StorageGRID system, an OpenStack Swift system, a Ceph system, or other suitable system. The distributed storage system 104 includes one or more storage nodes 106 over which the data is distributed. The storage nodes 106 are coupled via a back-end network 108, which may include any number of wired and/or wireless networks such as a Local Area Network (LAN), an Ethernet subnet, a PCI or PCIe subnet, a switched PCIe subnet, a Wide Area Network (WAN), a Metropolitan Area Network (MAN), the Internet, or the like. In some exemplary embodiments, the storage nodes 106 are coupled by a TCP/IP back-end network 108, which is local to a rack or datacenter, although additionally or in the alternative, the network 108 may extend between sites in a WAN configuration or be a virtual network extending throughout a cloud. As can be seen, the storage nodes 106 may be as physically close or as widely dispersed as the application may warrant. In some examples, the storage nodes 106 are housed in the same racks. In other examples, storage nodes 106 are located in different facilities at different sites anywhere in the world. The node arrangement may be determined based on cost, fault tolerance, network infrastructure, geography of the hosts, and other considerations. A technique for preserving and restoring the data contained in these storage nodes 106, suitable for use with any of these arrangements, is described with reference to the figures that follow.

In the illustrated embodiment, the computing architecture 100 includes a plurality of storage nodes 106 in communication with a plurality of hosts 102. It is understood that for clarity and ease of explanation, only limited number of storage nodes 106 and hosts 102 are illustrated, although the computing architecture 100 may include any number of hosts 102 in communication with a distributed storage system 104 containing any number of storage nodes 106. An exemplary storage system 104 receives data transactions (e.g., requests to read and/or write data) from the hosts 102 and takes an action such as reading, writing, or otherwise accessing the requested data so that storage devices 110 of the storage nodes 106 appear to be directly connected (local) to the hosts 102. This allows an application running on a host 102 to issue transactions directed to the data of the distributed storage system 104 and thereby access this data as easily as it can access data on storage devices local to the host 102. In that regard, the storage devices 110 of the distributed storage system 104 and the hosts 102 may include hard disk drives (HDDs), solid state drives (SSDs), storage class memory (SCM), RAM drives, optical drives, and/or any other suitable volatile or non-volatile data storage medium.

With respect to the storage nodes 106, an exemplary storage node 106 contains any number of storage devices 110 in communication with one or more storage controllers 112. The storage controllers 112 exercise low-level control over the storage devices 110 in order to execute (perform) data transactions on behalf of the hosts 102, and in so doing, may group the storage devices for speed and/or redundancy using a protocol such as RAID (Redundant Array of Independent/Inexpensive Disks). The grouping protocol may also provide virtualization of the grouped storage devices 110. At a high level, virtualization includes mapping physical addresses of the storage devices into a virtual address space and presenting the virtual address space to the hosts 102, other storage nodes 106, and other requestors. In this way, the storage node 106 represents the group of devices as a single device, often referred to as a volume. Thus, a requestor can access data within a volume without concern for how it is distributed among the underlying storage devices 110.

In addition to storage nodes, the distributed storage system 104 may include ancillary systems or devices (e.g., load balancers 114). For example, in some embodiments, a host 102 may initiate a data transaction by providing the transaction to a load balancer 114. The load balancer 114 selects one or more storage nodes 106 to service the transaction. When more than one alternative is possible, the load balancer 114 may select a particular storage node 106 based on any suitable criteria including storage node load, storage node capacity, storage node health, network quality of service factors, and/or other suitable criteria. Upon selecting the storage node(s) 106 to service the transaction, the load balancer 114 may respond to the host 102 with a list of the storage nodes 106 or may forward the data transaction to the storage nodes 106. Additionally or in the alternative, a host 102 may initiate a data transaction by contacting one or more of the storage nodes 106 directly rather than contacting the load balancer 114.

Turning now to the hosts 102, a host 102 includes any computing resource that is operable to exchange data with the distributed storage system 104 by providing (initiating) data transactions to the distributed storage system 104. In an exemplary embodiment, a host 102 includes a host bus adapter (HBA) 116 in communication with the distributed storage system 104. The HBA 116 provides an interface for communicating, and in that regard, may conform to any suitable hardware and/or software protocol. In various embodiments, the HBAs 116 include Serial Attached SCSI (SAS), iSCSI, InfiniBand, Fibre Channel, and/or Fibre Channel over Ethernet (FCoE) bus adapters. Other suitable protocols include SATA, eSATA, PATA, USB, and FireWire. In many embodiments, the host HBAs 116 are coupled to the distributed storage system 104 via a front-end network 118, which may include any number of wired and/or wireless networks such as a LAN, an Ethernet subnet, a PCI or PCIe subnet, a switched PCIe subnet, a WAN, a MAN, the Internet, or the like. To interact with (e.g., read, write, modify, etc.) remote data, the HBA 116 of a host 102 sends one or more data transactions to the load balancer 114 or to a storage node 106 directly via the front-end network 118. Data transactions may contain fields that encode a command, data (i.e., information read or written by an application), metadata (i.e., information used by a storage system to store, retrieve, or otherwise manipulate the data such as a physical address, a logical address, a current location, data attributes, etc.), and/or any other relevant information.

While the load balancers 114, storage nodes 106, and the hosts 102 are referred to as singular entities, a storage node 106 or host 102 may include any number of computing devices and may range from a single computing system to a system cluster of any size. Accordingly, each load balancer 114, storage node 106, and host 102 includes at least one computing system, which in turn includes a processor such as a microcontroller or a central processing unit (CPU) operable to perform various computing instructions. The computing system may also include a memory device such as random access memory (RAM); a non-transitory computer-readable storage medium such as a magnetic hard disk drive (HDD), a solid-state drive (SSD), or an optical memory (e.g., CD-ROM, DVD, BD); a video controller such as a graphics processing unit (GPU); a communication interface such as an Ethernet interface, a Wi-Fi (IEEE 802.11 or other suitable standard) interface, or any other suitable wired or wireless communication interface; and/or a user I/O interface coupled to one or more user I/O devices such as a keyboard, mouse, pointing device, or touchscreen.

Figure 2:
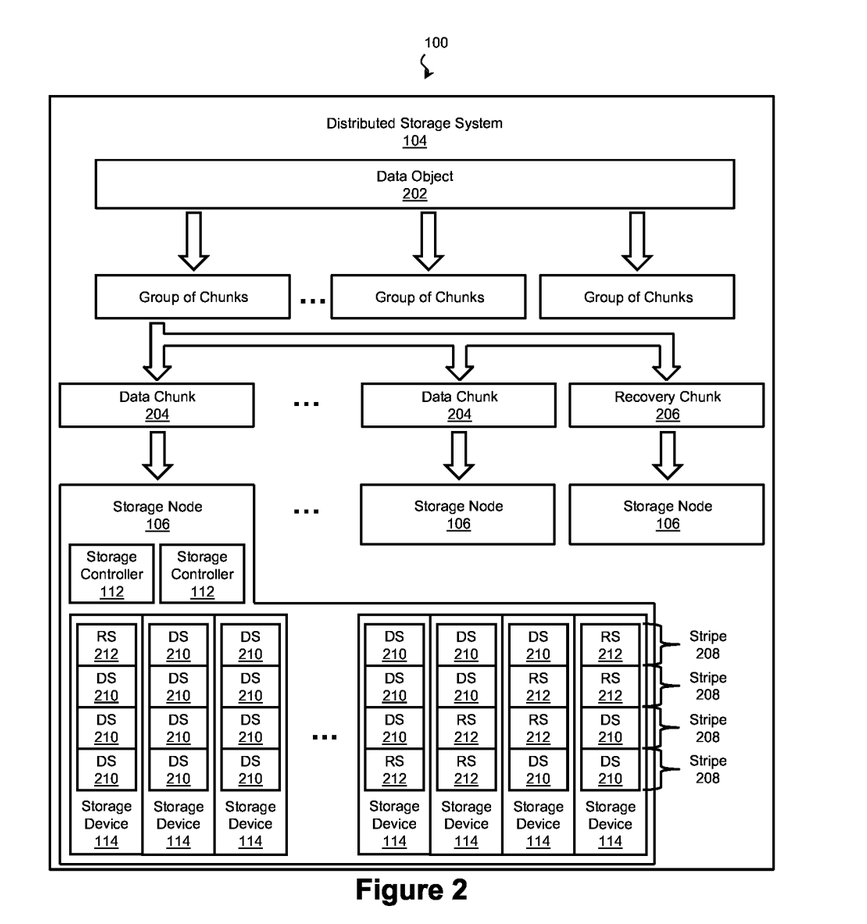
FIG. 2 is a schematic diagram of a portion of the computing architecture showing data distribution according to aspects of the present disclosure.

As described above, the storage system 104 may distribute the hosts' data across the storage nodes 106 for performance reasons as well as redundancy. Such distribution of data is described with further reference to FIG. 2. FIG. 2 is a schematic diagram of a portion of the computing architecture 100 showing data distribution according to aspects of the present disclosure. The computing architecture 100 includes a distributed storage system 104 having a plurality of storage nodes 106, each substantially similar to those of FIG. 1.

In some of the examples of FIG. 2, the distributed storage system 104 is an object-based data system. In brief, object-based data systems provide a level of abstraction that allows data of any arbitrary size to be specified by an object identifier. In contrast, block-level data transactions refer to data using an address that corresponds to a sector of a storage device and may include a physical address (i.e., an address that directly map to a storage device) and/or a logical address (i.e., an address that is translated into a physical address of a storage device). Exemplary block-level protocols include iSCSI, Fibre Channel, and Fibre Channel over Ethernet (FCoE). As an alternative to block-level protocols, file-level protocols specify data locations by a file name. A file name is an identifier within a file system that can be used to uniquely identify corresponding memory addresses. File-level protocols rely on a computing system to translate the file name into respective storage device addresses. Exemplary file-level protocols include CIFS/SMB, SAMBA, and NFS. Object-level protocols are similar to file-level protocols in that data is specified via an object identifier that is eventually translated by a computing system into a storage device address. However, objects are more flexible groupings of data and may specify a cluster of data within a file or spread across multiple files. Object-level protocols include CDMI, HTTP, SWIFT, and S3. Referring to FIG. 2, one of the many data objects 202 of the distributed storage system is illustrated, although it is understood that data object 202 represents any arbitrary unit of data regardless of whether it is organized as an object, a file, or a set of blocks.

The distributed storage system 104 may utilize an upper-level data protection scheme to protect against failure of a storage node 106 and a lower-level data protection scheme to protect against failure of a storage device 110. For example, to implement an upper-level data protection scheme, the storage controllers 112 of storage nodes 106 may coordinate to divide the data object 202 into groups of chunks such that the data object 202 can be reconstructed if some of the chunks are lost. In the illustrated embodiment, each group includes one or more data chunks 204 (which contain data and/or metadata) and one or more recovery chunks 206 (which contain recovery information such as parity information). In an example, the storage controllers 112 implement an erasure coding technique, such as a Reed-Solomon erasure code or Tornado erasure code, to generate the recovery chunks 206 for each group, although other suitable techniques may be used. Many such techniques are characterized by the number of data chunks 204 and recovery chunks 206 in each group. For example, a computing architecture 100 utilizing a 6+3 Reed Solomon erasure coding system creates six data chunks 204 and three recovery chunks 206 per group. In this example, the data of the data chunks 204 can be recreated from any six chunks (data chunks 204 and/or recovery chunks 206), provided none of the chunks are duplicates.

The chunks are then distributed among the storage nodes 106. Dividing the data chunks 204 and the recovery chunks 206 among the storage nodes 106 provides redundancy in the event of a storage node 106 failure. This distribution may also improve transaction response time because the chunks can be retrieved in parallel. In some embodiments, the storage nodes 106 are configured as peers so that any storage node 106 may divide a data object into groups of chunks, distribute the chunks, retrieve chunks, and/or reassemble the chunks into the data object. To aid in this, a storage controller 112 of each storage node 106 may maintain a distribution index for tracking the storage location of chunks throughout the distributed storage system 104. An example of a distribution index is described with reference to FIG. 3.

Figure 3:
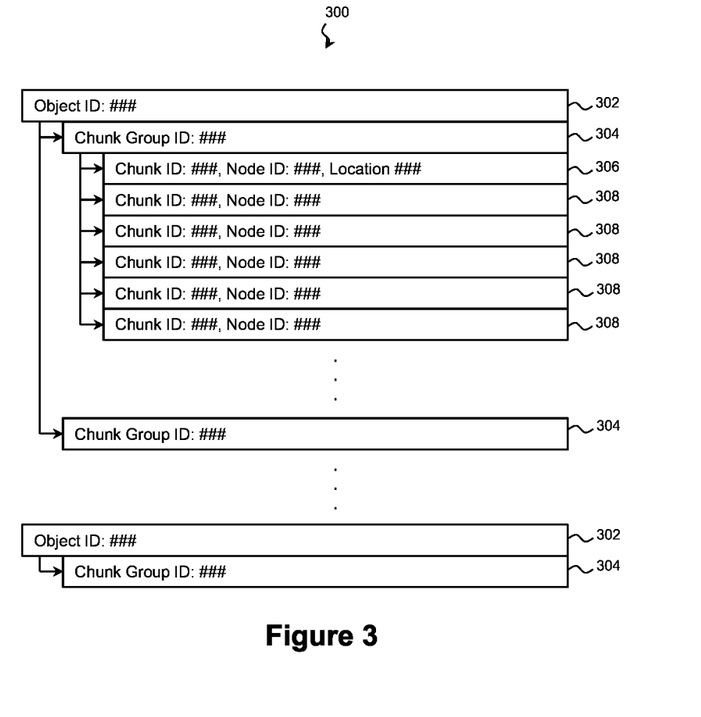
FIG. 3 is a memory diagram of a data distribution index according to aspects of the present disclosure.

FIG. 3 is a memory diagram of a data distribution index 300 according to aspects of the present disclosure. The data distribution index 300 includes a set of entries identifying data objects, their corresponding groups of chunks, and locations at which the chunks are stored. The entries may be maintained in any suitable representation including a linked list, a tree, a table such as a hash table, an associative array, a state table, a flat file, a relational database, and/or other memory structure. For example, the data distribution index 300 may be a distributed database such as an Apache Cassandra or other NoSQL database (e.g., MongoDB, RIAK, Redis, etc.) or an SQL database such as a MySQL database.

In the illustrated embodiment, an object entry 302 of the data distribution index 300 records a data object identifier and has a plurality of other entries associated with it (e.g., entries 304, 306, and 308). A group entry 304 records a group identifier of a group of chunks that is part of the data object. A chunk entry 306 records a chunk identifier of a chunk within one such group. The chunk entry 306 also records a storage node identifier for a storage node upon which the chunk is stored. Multiple such entries may be maintained if mirrored copies of the chunk are stored at more than one storage node. A chunk entry 306 may also record a location at which the chunk is stored on the storage node. The entry may reference a logical address (e.g., LBA, LUN ID, etc.), a physical address, a file name, an object name, or any other mechanism for specifying the storage location.

In some embodiments, each node 106 only records storage locations (e.g., address, file name, or object name) for its own chunks. For other chunks, the storage node 106 records which other node is storing the chunk without necessarily tracking where it is stored on the node. For example, in some embodiments, the data distribution index 300 may contain a second type of chunk entry 308 that records a chunk identifier and a node identifier for the node 106 upon which the chunk is stored but does not necessarily record where the chunk is stored in the node 106. In addition to reducing the size of the data distribution index 300, this may reduce the number of updates to the data distribution index 300 as chunks are moved within other nodes. In such embodiments, any storage node 106 can still request a chunk from any other node using the chunk identifier. To further streamline the data distribution index 300, in some embodiments, each node 106 only maintains entries for chunks stored on the node. Thus, the second type of chunk entry 308 may be omitted completely. In such embodiments, any storage node 106 can obtain chunks by providing the group identifier to each of the other storage nodes 106, which each respond with a list of chunks matching the group identifier stored on the respective storage node 106. Of course, data distribution index 300 is merely one example of a technique for tracking the distribution of data across the distributed storage system 104. Other tracking mechanisms are both contemplated and provided for.

Referring back to FIG. 2, for further protection, the storage controllers 112 of each storage node 106 may implement a lower-level data protection scheme. For example, in some embodiments, a storage controller 112 implements protection and virtualization using RAID 1 (mirroring), RAID 5 (striping with parity), or RAID 6 (striping with double parity). Some examples utilize an 8+2 RAID 6 parity scheme where data is arranged in a stripe 208 containing eight data segments 210 and two recovery segments 212 (sometimes identified as p and q). In the illustrated embodiment, each segment (data or recovery) is stored on a different storage device 110, of which a subset is shown.

Should a single storage device 110 fail, the associated storage node 106 may attempt to recreate the data contained on the failed storage device 110 using the lower-level protection scheme. For stripes 208 in which the failed storage device 110 contained data segments 210, the storage controller 112 may recover the data or metadata from the remaining data segments 210 and recovery segments 212 on the other storage devices 110. For stripes 208 in which the failed storage device 110 contained recovery segments 212, the storage controller 112 may regenerate the recovery data from the data segments 210 on the other storage devices 110. The recovered segments may then be saved to a replacement storage device 110. In some embodiments, the storage node 106 may continue to service transactions without any noticeable impairment during the recovery process; however, it is also common for data recovery to affect storage node 106 performance. For example, during recovery, the storage node 106 may stop performing other transactions or may continue to handle transactions directed to intact portions of the address space albeit with reduced performance.

Despite these safeguards, it is possible for more storage devices 110 to fail than the lower-level data protection scheme can recover. For example, a RAID 6 array can recover data when two storage devices 110 fail, but cannot recover from three failing storage devices 110 in the same RAID group. For a 60-drive storage node 106 utilizing RAID 6 groups, three failing devices 110 represents only 5% of the total storage capacity. However, this loss may be enough to render the group unusable.

If the storage node 106 cannot recover the data using the lower-level protection scheme, the upper-level protection scheme may be utilized to reconstruct the data on the failed devices 110. In the case of a full node rebuild, for each chunk stored on the failed storage node 106, enough data chunks 204 and/or recovery chunks 206 are retrieved from the other storage nodes 106 to reconstruct the missing chunk. It should be noted that the amount of data retrieved may be many times larger than the amount of data being recovered. For example, a computing architecture 100 utilizing a 6+3 Reed Solomon erasure coding system utilizes six chunks (any combination of data chunks 204 and/or recovery chunks 206) to recover up to three remaining chunks. Therefore, recovery may entail transferring six chunks for every one recovered. In order to perform a full node rebuild of a 200 TB storage node 106, the distributed storage system may transfer 1.2 PB of data over the back-end network 108. Therefore, a technique for recovering data using less than a full node rebuild is beneficial for both the storage nodes 106 and the back-end network 108.

Figure 4:
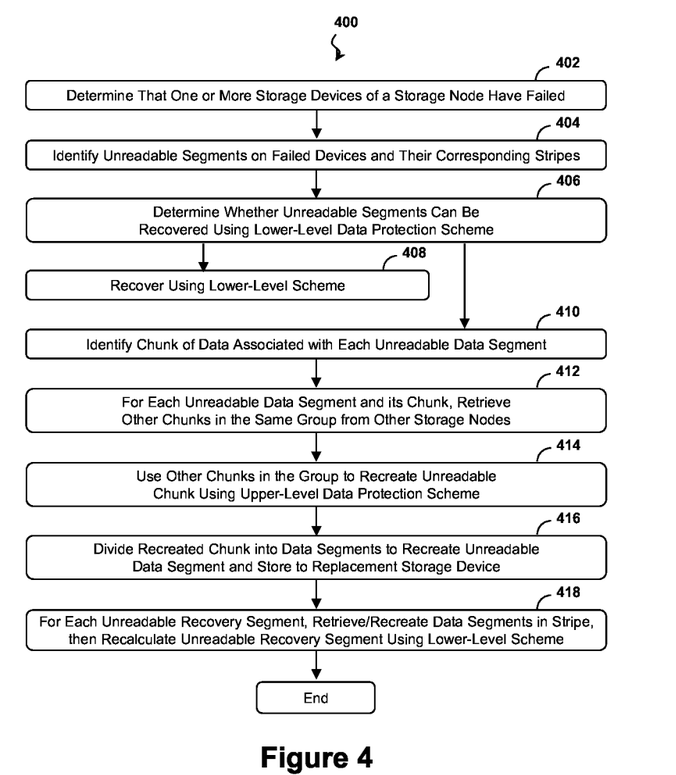
FIG. 4 is a flow diagram of a method of recovering data according to aspects of the present disclosure.
Figure 5:
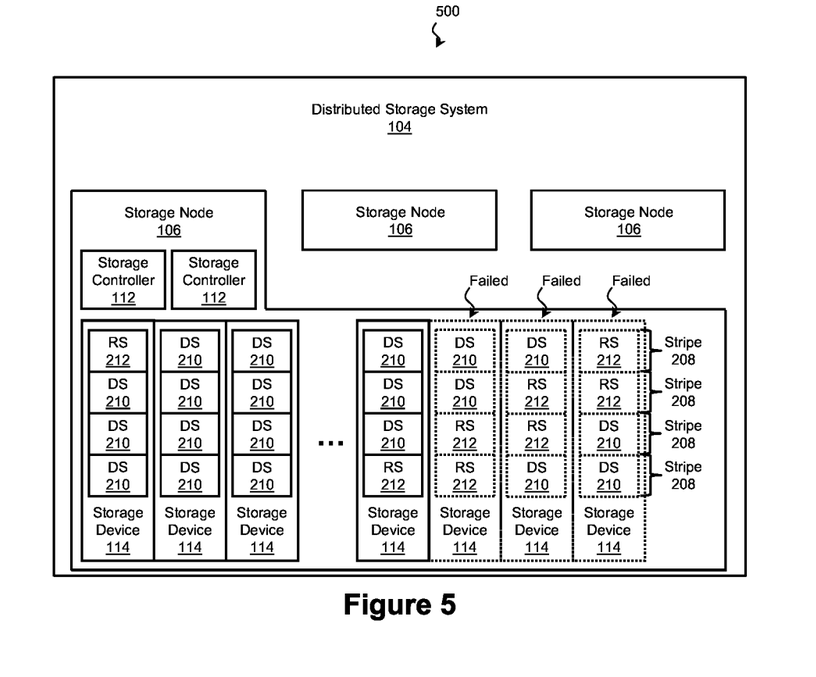
FIGS. 5 and 6 are system diagrams of a computing architecture performing the method of recovering data according to aspects of the present disclosure.
Figure 6:
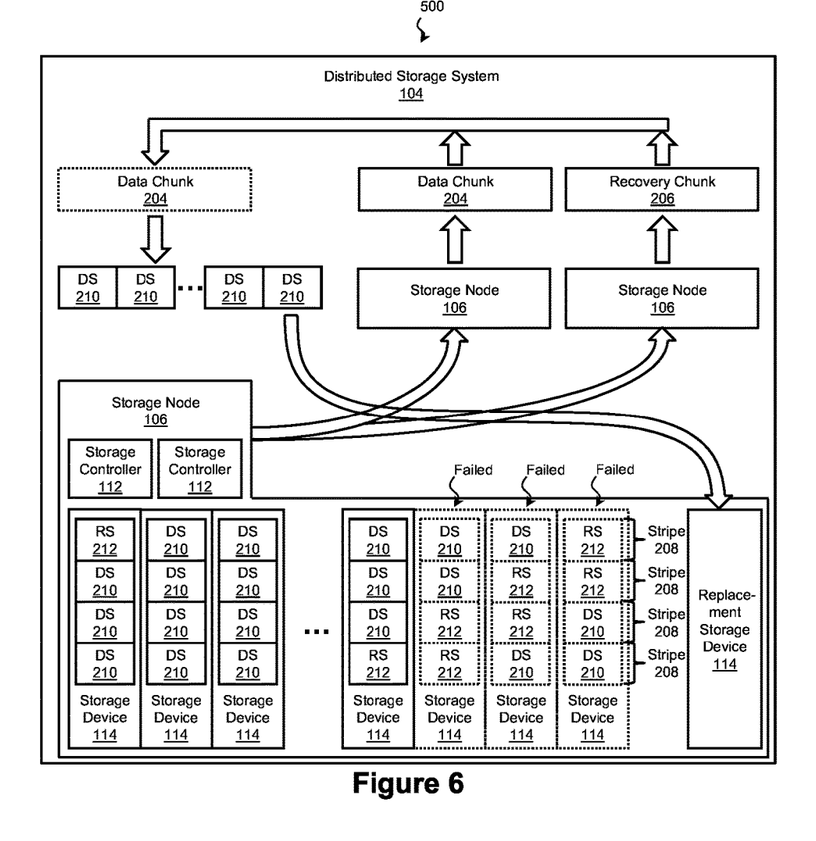

A system and technique for recovering data that utilizes a partial node rebuild, where appropriate, to reduce burden on the distributed storage system 104 is described with reference to FIGS. 4-6. FIG. 4 is a flow diagram of a method 400 of recovering data according to aspects of the present disclosure. It is understood that additional steps can be provided before, during, and after the steps of method 400, and that some of the steps described can be replaced or eliminated for other embodiments of the method. FIGS. 5 and 6 are system diagrams of a computing architecture 500 performing the method 400 of recovering data according to aspects of the present disclosure.

The computing environment 500 may be substantially similar to the computing architecture 100 above and may include a distributed storage system 104 and one or more storage nodes 106 each substantially similar to those described with reference to FIGS. 1-2. In that regard, the distributed storage system 104 may distribute data among the storage nodes 106 according to an upper-level data protection scheme. In turn, each of the storage nodes 106 may distribute its portion of the data across a plurality of storage devices 110 arranged and configured according to a lower-level data protection scheme. For example, the storage nodes 106 may distribute data across the storage devices 110 according to RAID 1, RAID 5, RAID 6, or other suitable protocol.

Referring to block 402 of FIG. 4 and to FIG. 5, a storage controller 112 of a storage node 106 determines that one or more storage devices 110 of the storage node 106 have failed. Referring to block 404 of FIG. 4, the storage controller 112 identifies data that cannot be read from the failed storage devices 110 by segment (e.g., data segments 210 or recovery segments 212) and identifies the stripes 208 to which the inaccessible segments correspond. Because a storage device 110 may have some bad sectors and some accessible sectors, in some examples, this includes identifying a subset of data or metadata on the failed storage device(s) 110 that cannot be read from the failed storage device(s) themselves. In such examples, accessible data and metadata may be copied directly to a replacement storage device 110 while inaccessible data and metadata may be recovered. The lower-level data protection scheme may be used to verify any accessible data on a failed storage device 110 prior to or during the copying process. For example, parity information may be used to verify that the accessible data satisfies the parity relationship.

Referring to block 406 of FIG. 4, the storage controller 112 determines whether the inaccessible segments stored on the failed storage device(s) 110 can be recovered using the lower-level data protection scheme. If so, referring to block 408 of FIG. 4, the storage controller 112 recovers each inaccessible segment by reading the remaining segments (data segments 210 and/or recovery segments 212) of the corresponding stripe 208 from the remaining storage devices 110. This allows the storage controller to recreate the segments of the failed storage device(s) 110 by using a recovery algorithm of the lower-level protection scheme. In a RAID 5 or 6 example, inaccessible data segments 210 may be recovered by reading the remaining data segments 210, reading the parity information in the recovery segments 212, and solving for the missing data segment values using the parity equation(s). Similarly, inaccessible recovery segments 212 may be recovered by reading the data segments 210 and generating the parity information of the recovery segments 212 using the parity equation(s). Of course, other lower-level protections schemes may have other recovery algorithms. The storage controller 112 may then store the recreated segments to one or more replacement storage devices 110.

If the storage controller 112 determines that the segments stored on the failed storage device(s) 110 cannot be recovered using the lower-level data protection scheme, the storage controller reconstructs the data segments 210 using the upper-level data protection scheme and recalculates the recovery segments 212 using the lower-level data protection scheme as described in blocks 410-418. This may occur, for example, when more storage devices 110 have failed than the lower-level data protection scheme can tolerate. In block 410, the storage controller 112 identifies one or more chunks of data (e.g., data chunks 204 and/or recovery chunks 206) associated with the inaccessible data segments 210 of the failed storage device(s) 110. This may be done using a data distribution index 300 such as the one described in the context of FIG. 3. In an example, the storage controller 112 queries the chunk entries 306 of the data distribution index 300 to identify chunks stored on the stripes 208 with inaccessible data segments 210.

Referring to block 412 of FIG. 4 and to FIG. 6, for each inaccessible data segment 210 stored on the failed storage devices 110, the storage controller 112, having identified the chunk to which it corresponds, requests and retrieves the other chunks in the group from the other storage nodes 106. This may include examining the group entries 304 and chunk entries 308 of the of the data distribution index 300 to identify a group and requesting the chunks of the group from the other storage nodes 106 using a chunk identifier and/or a group identifier. In some examples, the storage controller 112 retrieves only a subset of the chunks in the group. The subset may contain enough data chunks 204 and recovery chunks 206 to recover the inaccessible chunk. In the 6+3 Reed Solomon erasure coding example described above, the storage controller 112 selects any six of the chunks in the group because the upper-level data protection scheme can reconstruct the inaccessible chunk from any combination of six or more chunks. The storage controller 112 may select the subset based on any suitable criteria including storage node load, storage node capacity, storage node health, network quality of service factors, and/or other suitable criteria. Furthermore, in some embodiments, the storage controller retrieves a subset with more than the minimum number of chunks. The additional chunks can be used to verify the recovered chunk. While this approach may be undesirable during a full node rebuild because of the amount of data transferred, because the partial node rebuild reconstructs a smaller data set, the impact is not nearly as severe.

Referring to block 414 of FIG. 4 and to FIG. 6, the storage controller 112 recovers the chunk 204 corresponding to the inaccessible data segment 210 using a recovery algorithm of the upper-level data protection scheme. Referring to block 416 of FIG. 4, the inaccessible data segment 210 is recreated from the recovered chunk by merely dividing the recovered chunk into segments and determining which segment corresponds to the inaccessible data segment 210. The corresponding data segment may then be stored to the replacement storage device 110. In some embodiments, the storage controller 112 determines the location (e.g., LBA, LUN, etc.) at which the inaccessible data segment 210 was located and stores the recovered data segment 210 to the exact same location on the replacement storage device 110.

It is noted that the chunks and stripes 208 may have any suitable size relationship. In that regard, a single chunk may span multiple stripes 208, and a stripe 208 may contain data from more than one chunk. It can be seen that where a single chunk spans multiple stripes 208, inaccessible segments from all of the stripes 208 can be recreated from a single recovered chunk. Likewise, where a stripe contains data from more than one chunk, the method 400 does not require all the chunks in the stripe to be recovered. This may reduce the number of chunks that are requested from the other storage nodes 106.

Referring to block 418, for each inaccessible recovery segment 212 stored on the failed storage devices 110, the storage controller 112 may first recover all inaccessible data segments 210 in the stripe 208 (if any). The storage controller may then use the data segments 210 in the stripe to recalculate the recovery data of the inaccessible recovery segment 212. The recovery data is then stored to the replacement storage device 110.

By recovering only the data chunks associated with inaccessible data segments 210, the storage controller may perform a partial rebuild of the storage node 106. It can be seen that this provides a substantial improvement to conventional data recovery techniques with several possible advantages. First, far less data may be transferred during a partial node rebuild than during a full node rebuild because the size of the dataset being rebuilt is smaller. Depending on the upper-level protection scheme, rebuilding each chunk may require transferring many six, eight, ten chunks or more. Accordingly, rebuilding a 200 TB dataset completely could entail retrieving 1.2 PB of data over the back-end network. In this manner, a partial rebuild greatly reduces the network impact associated with a storage device failure. In an example, a storage node rebuilding only 10% of its total chunks would request only 10% as much data. Second, because the dataset is smaller, a partial rebuild may reduce the processing burden on the rebuilding node, which may allow the rebuilding node to continue to service transactions. Third, a partial node rebuild may be completed quicker than a full node rebuild. This reduces the rebuilding window when the storage node is most vulnerable to data loss caused by further device failures. Of course, these advantages are merely exemplary, and no particular advantage is required for any particular embodiment.

The present embodiments can take the form of an entirely hardware embodiment, an entirely software embodiment, or an embodiment containing both hardware and software elements. Accordingly, it is understood that any operation of the computing systems of computing architecture 100 or computing architecture 500 may be implemented by the respective computing system using corresponding instructions stored on or in a non-transitory computer readable medium accessible by the processing system. For the purposes of this description, a tangible computer-usable or computer-readable medium can be any apparatus that can store the program for use by or in connection with the instruction execution system, apparatus, or device. The medium may include non-volatile memory including magnetic storage, solid-state storage, optical storage, cache memory, and Random Access Memory (RAM).

Thus, the present disclosure provides a system, method, and machine-readable storage medium for recovering data in a distributed storage system. In some embodiments, the method includes identifying a failing storage device of a first storage node having an inaccessible data segment stored thereupon. It is determined whether the inaccessible data segment can be recovered using a first data protection scheme utilizing data stored on the first storage node. When it is determined that the inaccessible data segment cannot be recovered using the first data protection scheme, a first chunk of data associated with the inaccessible data segment is identified and a group associated with the first chunk of data is identified. A second chunk of data associated with the group is selectively retrieved from a second storage node such that data associated with an accessible data segment of the first storage node is not retrieved. The inaccessible data segment is recovered by recovering the first chunk of data using a second data protection scheme and the second chunk of data. In some such embodiments, the method further includes determining a logical block address of the inaccessible data segment and storing the recovered inaccessible data segment on a replacement storage device at a location corresponding to the logical block address. In some such embodiments, the first storage node has an inaccessible protection segment, and the method further includes recovering the inaccessible protection segment using the first data protection scheme and the recovered inaccessible data segment.

In further embodiments, the non-transitory machine-readable medium has instructions for performing the method of data recovery, including machine executable code, which when executed by at least one machine, causes the machine to: identify a first data segment of a storage node that cannot be accessed; identify a second data segment of the storage node that can be accessed; determine that a number of failed storage device exceeds a maximum supported by a first data protection scheme; identify a first set of data structures distributed across at least one storage node from which the first data segment can be recovered using a second data protection scheme; selectively retrieve the first set of data structures from the at least one storage node without a second set of data structures from which the second data segment can be recovered using the second data protection scheme; and recover the first data segment using the first set of data structures. In some such embodiments, the first data protection scheme is a RAID data protection scheme and the second data protection scheme is one of a Reed-Solomon erasure code protection scheme or a Tornado erasure code protection scheme.

In yet further embodiments, the computing device includes a memory containing a machine-readable medium comprising machine executable code having stored thereon instructions for performing a method of data recovery and a processor coupled to the memory. The processor is configured to execute the machine executable code to: identify a failing storage device and an inaccessible data segment stored thereupon; determine that the inaccessible data segment cannot be recovered using a RAID data recovery technique; identify a first group of data stored upon a plurality of storage nodes associated with the inaccessible data segment; selectively retrieve the first group of data from the plurality of storage nodes, wherein selectively retrieving does not retrieve a second group of data associated with an accessible data segment; and recreate the inaccessible data segment using the first group of data segments. In some such embodiments, the RAID data recovery technique includes one of a RAID 1, RAID 5, or RAID 6 data recovery technique.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
   identifying, by a storage controller of a first storage node in a plurality of storage nodes coupled via a network within a distributed storage system, a failing storage device of the first storage node;
   determining that an inaccessible data segment of the failing storage device cannot be recovered using a low-level data protection scheme;
   responsive to the determination, identifying a first chunk of data associated with the inaccessible data segment and a group of data chunks associated with the first chunk of data;
   selectively retrieving, via the network, a second chunk of data from a second storage node in the plurality of storage nodes, wherein the second chunk of data is also associated with the group of data chunks, and wherein the selectively retrieved data does not include data associated with an accessible data segment of the first storage node;
   recovering the first chunk of data using an upper-level data protection scheme and the second chunk of data;
   storing the recovered inaccessible data segment on a replacement storage device; and
   transferring the accessible data segment from the failing storage device to the replacement storage device.

2. The method of claim 1, wherein storing the recovered inaccessible data segment comprises:
   storing the recovered inaccessible data segment on the replacement storage device at a location corresponding to a logical block address of the inaccessible data segment.

3. The method of claim 1, wherein the first storage node further has an inaccessible protection segment stored thereupon, the method further comprising recovering the inaccessible protection segment using the low-level data protection scheme and the recovered inaccessible data segment.

4. The method of claim 1, wherein the inaccessible data segment is stored on a RAID array of storage devices of the first storage node, and wherein the low-level data protection scheme is a RAID data protection scheme.

5. The method of claim 4, wherein the RAID data protection scheme is selected from the group consisting of RAID 1, RAID 5, and RAID 6.

6. The method of claim 1, wherein the upper-level data protection scheme is selected from the group consisting of: a Reed-Solomon erasure code protection scheme and a Tornado erasure code protection scheme.

7. The method of claim 1, wherein selectively retrieving the second chunk of data includes retrieving a subset of chunks of the group, wherein the subset includes the second chunk, and wherein the subset includes less than all chunks of the group.

8. The method of claim 1,
wherein the upper-level data protection scheme defines a minimum number of chunks to reconstruct an inaccessible chunk.

9. The method of claim 1, wherein the second chunk of data is part of a subset of data chunks in the group associated with the first chunk of data, and the subset is determined based on at least one of storage node load, storage node capacity, storage node health, or a network quality of service factor.

10. The method of claim 1, wherein the plurality of storage nodes are physically arranged across different facilities at different sites within the distributed storage system, and node arrangement is determined based on at least one of a cost, a fault tolerance, a network infrastructure, or a geography of hosts.

11. A non-transitory machine-readable medium having stored thereon instructions for performing a method of data recovery, comprising machine executable code which when executed by at least one machine, causes the machine to:
identify, by a storage controller of a first storage node in a plurality of storage nodes coupled via a network within a distributed storage system, an inaccessible data segment of the first storage node;
identify an accessible data segment of the first storage node;
determine that a number of failed storage devices exceeds a maximum supported by a low-level data protection scheme;
identify a first chunk of data associated with the inaccessible data segment and a group of data chunks associated with the first chunk of data;
selectively retrieve, via the network, a second chunk of data from at least one second storage node in the plurality of storage nodes, wherein the second chunk of data is also associated with the group of data chunks and the selectively retrieved data does not include data associated with the accessible data segment of the first storage node;
recover the inaccessible data segment using an upper-level data protection scheme and the second chunk of data;
store the inaccessible data segment on a replacement storage device; and
transfer the accessible data segment from the first storage node to the replacement storage device.

12. The non-transitory machine-readable medium of claim 11 comprising further machine executable code which causes the machine to:
recover a recovery segment of the first storage node using the recovered inaccessible data segment and the low-level data protection scheme.

13. The non-transitory machine-readable medium of claim 11, wherein the low-level data protection scheme is a RAID data protection scheme.

14. The non-transitory machine-readable medium of claim 13, wherein the upper-level data protection scheme is selected from the group consisting of: a Reed-Solomon erasure code protection scheme and a Tornado erasure code protection scheme.

15. The non-transitory machine-readable medium of claim 11, wherein the upper-level data protection scheme defines a minimum number of data chunks to recover the inaccessible data segment, and wherein the first chunk of data includes more than the minimum number.

16. The non-transitory machine-readable medium of claim 15, comprising further machine executable code which causes the machine to verify the inaccessible data segment using the first set of data structures.

17. A computing device comprising:
a memory containing a machine-readable medium comprising machine executable code having stored thereon instructions for performing a method of data recovery; and
a processor coupled to the memory, the processor configured to execute the machine executable code to:
identify, by a storage controller of a first storage node in a plurality of storage nodes coupled via a network within a distributed storage system, a failing storage device of the first storage node;
determine that an inaccessible data segment of the failing storage device cannot be recovered using a RAID data recovery technique;
identify a first chunk of data associated with the inaccessible data segment and a group of data chunks associated with the first chunk of data within the distributed storage system;
selectively retrieve a second chunk of data from a second storage node in the plurality of storage nodes via the network, wherein the second chunk of data is also associated with the group of data chunks and the selectively retrieved data does not include data associated with an accessible data segment of the first storage node;
recreate the inaccessible data segment using an upper-level data protection scheme and the second chunk of data;
write the recreated inaccessible data segment to a replacement storage device; and
transfer the accessible data segment from the failing storage device to the replacement storage device.

18. The computing device of claim 17, wherein the RAID data recovery technique includes one of a RAID 1, RAID 5, or RAID 6 data recovery technique.

19. The computing device of claim 17, wherein the upper-level data protection scheme is at least one of a Reed-Solomon erasure code technique or a Tornado erasure code technique.

* * * * *